US008843866B2

(12) United States Patent
Ishikawa

(10) Patent No.: US 8,843,866 B2
(45) Date of Patent: Sep. 23, 2014

(54) SUPPORT APPARATUS, DESIGN SUPPORT METHOD, AND COMPUTER-READABLE RECORDING MEDIUM

(71) Applicant: Fujitsu Limited, Kawasaki (JP)

(72) Inventor: Yoichiro Ishikawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/037,483

(22) Filed: Sep. 26, 2013

(65) Prior Publication Data

US 2014/0157219 A1 Jun. 5, 2014

(30) Foreign Application Priority Data

Dec. 5, 2012 (JP) ................................. 2012-266776

(51) Int. Cl.
G06F 17/50 (2006.01)
(52) U.S. Cl.
CPC ........ *G06F 17/5081* (2013.01); *G06F 2217/78* (2013.01); *G06F 17/5022* (2013.01); *G06F 2217/82* (2013.01)
USPC .............. 716/111; 716/106; 716/136; 703/16
(58) Field of Classification Search
CPC ............ G06F 17/5081; G06F 17/5022; G06F 2217/82; G06F 2217/78
USPC .............................. 716/111, 106, 136; 703/16
See application file for complete search history.

(56) References Cited

U.S. PATENT DOCUMENTS

| 4,777,622 | A | * | 10/1988 | Palm et al. | 365/49.1 |
| 5,397,861 | A | * | 3/1995 | Urquhart, II | 174/250 |
| 6,615,394 | B2 | * | 9/2003 | Ogawa et al. | 716/115 |
| 7,519,927 | B1 | * | 4/2009 | Hryckowian et al. | 716/100 |
| 2002/0011885 | A1 | * | 1/2002 | Ogawa et al. | 327/158 |
| 2002/0157069 | A1 | * | 10/2002 | Ogawa et al. | 716/5 |
| 2003/0227032 | A1 | * | 12/2003 | Nawa et al. | 257/208 |
| 2006/0100830 | A1 | * | 5/2006 | Lee et al. | 703/2 |
| 2008/0276213 | A1 | | 11/2008 | Aoki et al. | |

FOREIGN PATENT DOCUMENTS

| JP | 2004-186257 | 7/2004 |
| WO | 2007077623 | 7/2007 |

OTHER PUBLICATIONS

Cocchini et al. "Time-Domain Simulation of System Interconnect Using Convoluation and Newton-Raphson Iteration Methods", 2010, IEEE, 2010 Electronic Components and Technology Conference, pp. 646-651.*

Rossi et al., "Impact of ECCs on Simultaneously Switching Output Noise for On-Chip Busses of High Reliability Systems", Proceedings of the 10$^{th}$ IEEE International On-Llne Testing Symposium (IOLTS'04), IEEE, 2004, 6 pages.*

* cited by examiner

*Primary Examiner* — Phallaka Kik
(74) *Attorney, Agent, or Firm* — Fujitsu Patent Center

(57) ABSTRACT

A design support apparatus calculates a crosstalk noise value when a power line does not run parallel, for each of a plurality of sections. Moreover, the design support apparatus calculates a coefficient Fshield that becomes larger with decrease in the area of the power line included in an area between two signal lines based on a relative positional relationship between the two signal lines and the power line in a section, for each of the plurality of sections. Moreover, the design support apparatus corrects the crosstalk noise value corresponding to a section, using the coefficient Fshield corresponding to the section, for each of the plurality of sections. Moreover, the design support apparatus calculates a total of the corrected crosstalk noise values corresponding respectively to the plurality of sections as a crosstalk noise value between the two signal lines.

6 Claims, 17 Drawing Sheets

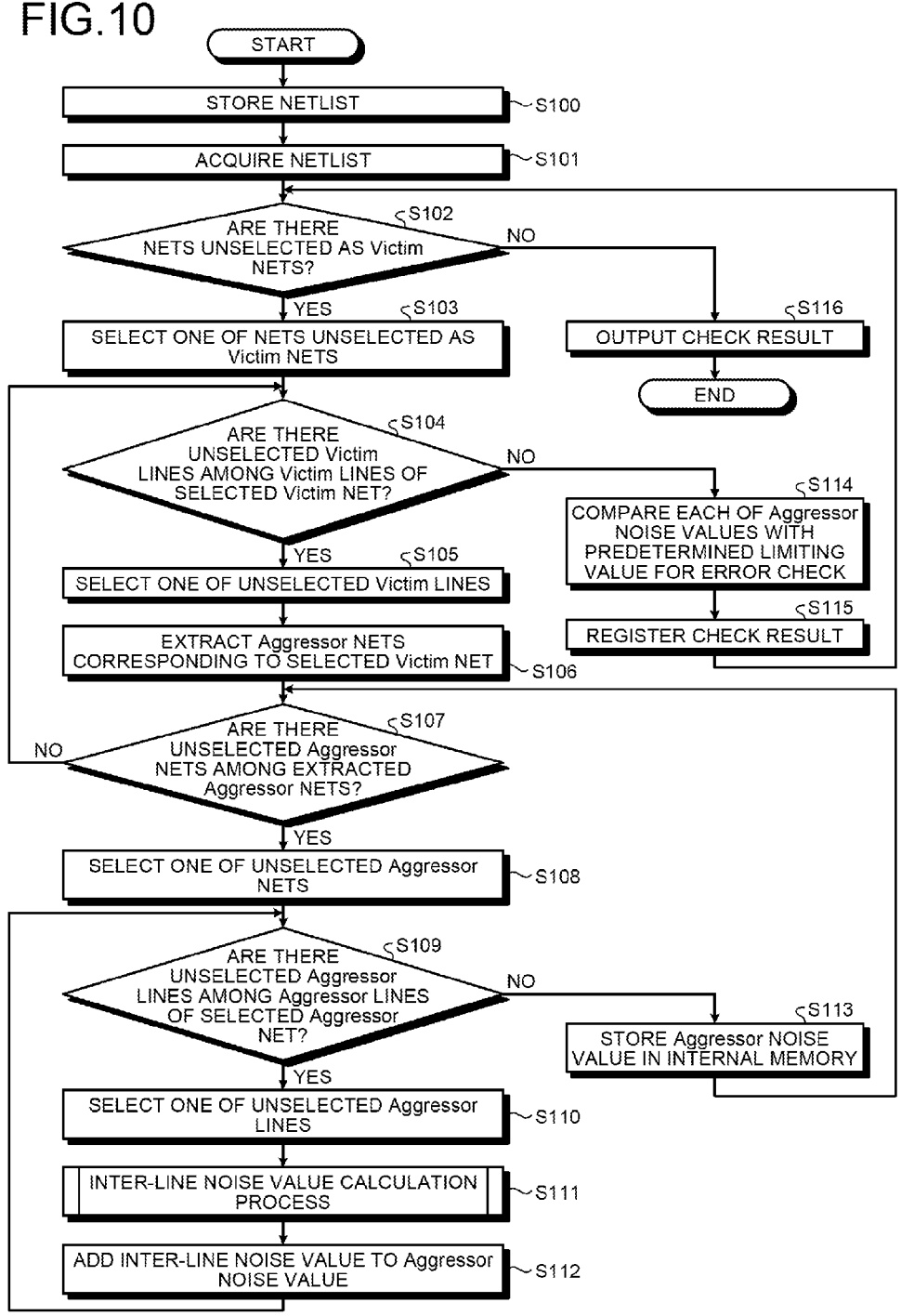

SUPPORT APPARATUS, DESIGN SUPPORT METHOD, AND COMPUTER-READABLE RECORDING MEDIUM

CROSS-REFERENCE TO RELATED APPLICATION

This application is based upon and claims the benefit of priority of the prior Japanese Patent Application No. 2012-266776, filed on Dec. 5, 2012, the entire contents of which are incorporated herein by reference.

FIELD

The embodiment discussed herein is directed to a design support apparatus, a design support method, and a design support program.

BACKGROUND

In recent years, semiconductor integrated circuits such as LSIs (Large Scale Integration) are progressing with finer design rules and greater densities. For example, hierarchical design is common as a layout design method of semiconductor integrated circuits. In the hierarchical design, for example, a circuit divided into a plurality of blocks in accordance with their functions is layered, and layout design is performed by a plurality of designers, respectively, for the layers. Data of the layout designs are subsequently collected for the entire layout design.

Moreover, as described above, in semiconductor integrated circuits, a distance between signal lines is becoming shorter with finer design rules and greater densities. Therefore, the influence of crosstalk noise between signal lines on a semiconductor integrated circuit is becoming stronger, and there are various technologies for suppressing the influence of crosstalk noise. For example, there is a technology for shielding crosstalk noise by inserting a power line around a signal line (in eight directions), or by inserting a power line running parallel between two signal lines in a semiconductor integrated circuit.

Patent Document 1: International Publication Pamphlet No. WO 2007/077623
Patent Document 2: Japanese Laid-open Patent Publication No. 2004-186257

However, in the above technology, a power line is inserted to shield crosstalk noise, which may decrease the degree of freedom in layout, and there are also some places where insertion is difficult. Moreover, there are also some power lines that are difficult to be inserted, such as global power lines arranged in a grid (mesh) pattern. Furthermore, it is difficult to realize parallel arrangement of a power line in order to perform shielding for a massive number of lines.

In other words, if the above technology for inserting a power line is applied to a semiconductor integrated circuit, it is difficult to realize parallel arrangement of a power line for all lines, and in reality parts where a power line runs parallel and parts where the power line does not run parallel are mixed.

Here, in a crosstalk noise check on a semiconductor integrated circuit having both parts where a power line runs parallel and where the power line does not run parallel, an effect of a power line suppressing crosstalk noise is ignored even if there exists the part where the power line runs parallel. In other words, a crosstalk noise value is calculated assuming that crosstalk noise is not suppressed by the power line, and the crosstalk noise value is compared with a predetermined limiting value to perform an error determination. In this manner, examples of reasons why the suppression of crosstalk noise by a power line is ignored include, for example, that a process is performed at high speeds. As described above, the suppression of crosstalk noise by a power line is ignored. Accordingly, a crosstalk noise value to be calculated in a crosstalk noise check becomes larger than an actual value. Therefore, the number of error determinations increases in such a crosstalk noise check. In this case, the layout design of a semiconductor integrated circuit has a problem that the load of the layout design is heavy since work such as the extension of a distance between lines is performed at every error determination.

SUMMARY

According to an aspect of an embodiment, a design support apparatus includes a memory; and a processor coupled to the memory. The processor executes a process. The process includes when a power line runs parallel between two signal lines in a circuit, partitioning a direction in which the two signal lines extend into a plurality of sections based on a position of the power line running parallel; calculating a crosstalk noise value when the power line does not run parallel, for each of the plurality of partitions; calculating a coefficient that becomes larger with decrease in an area of the power line included in an area between the two signal lines based on a relative positional relationship between the two signal lines and the power line in the section, for each of the plurality of sections; correcting the crosstalk noise value corresponding to the section, using the coefficient corresponding to the section, for each of the plurality of sections; and calculating a total of the crosstalk noise values corrected and corresponding respectively to the plurality of sections, as a crosstalk noise value between the two signal lines.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a flowchart illustrating a procedure for a crosstalk noise check process according to the embodiment;

DESCRIPTION OF EMBODIMENTS

Preferred embodiments of the present invention will be explained with reference to accompanying drawings. The embodiment does not limit the technology of the disclosure.

The design support apparatus of the embodiment is an apparatus that carries out layout design of a semiconductor integrated circuit including a plurality of layers. Hereinafter, a description will be given taking an example of an LSI as a semiconductor integrated circuit.

Figure 1:
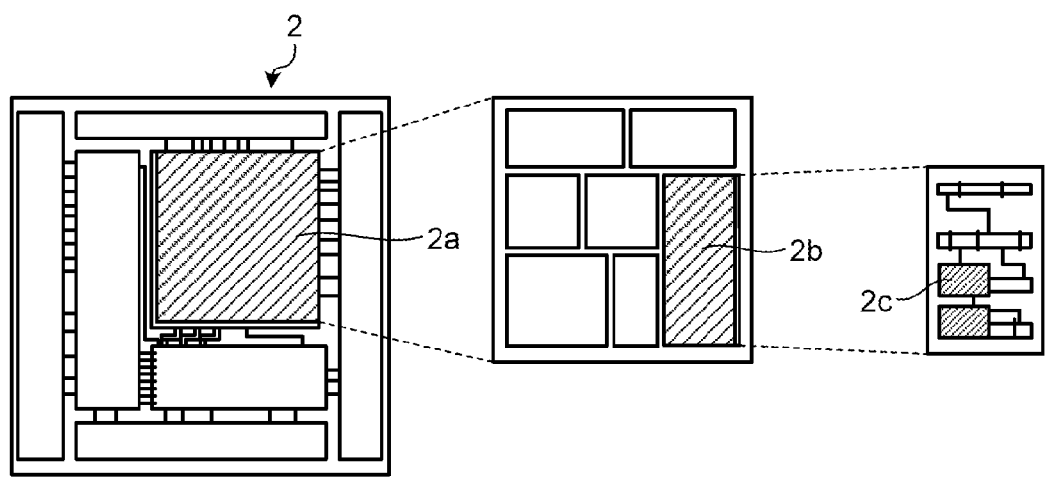
FIG. 1 is a diagram illustrating an example of an LSI model.

Here, a description will be given of an example of a model of an LSI (an LSI model) for which layout design is carried out by the design support apparatus of the embodiment. FIG. 1 is a diagram illustrating an example of an LSI model. An LSI model 2 illustrated in the example of FIG. 1 represents a case of including three layers by hierarchical partitioning to be described below. The LSI model 2 of the example of FIG. 1 includes a plurality of chips (chip) belonging to a first layer being a topmost layer. Moreover, the LSI model 2 includes a subchip (subchip) belonging to a second layer being a layer immediately below the first layer. Moreover, the LSI model 2 includes a subchip (subchip) belonging to a third layer being a layer immediately below the second layer. For example, as illustrated in FIG. 1, the LSI model 2 includes a chip 2a belonging to the first layer. Moreover, the chip 2a includes a subchip 2b belonging to the second layer. Moreover, the chip 2b includes a subchip 2c belonging to the third layer. The chip and the subchip are modules constituting an LSI.

Figure 2A:
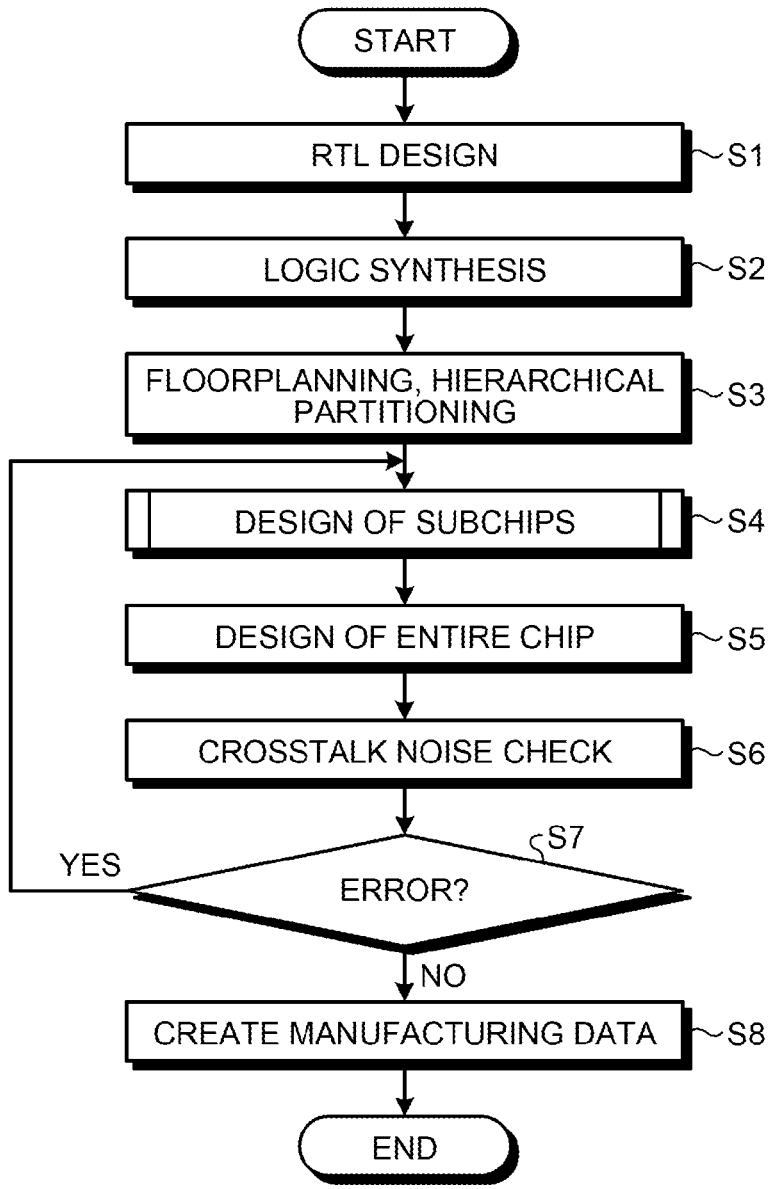
FIG. 2A is a diagram illustrating an example of a process flow of LSI design.

Next, an example of a process flow of LSI design will be described. FIG. 2A is a diagram illustrating an example of the process flow of LSI design.

[Step S1] Firstly, a designer designs an LSI by description in a description language such as Verilog HDL (Hardware Description Language) or VHDL (VHSIC HDL) based on an architecture (structure) predetermined to realize a desired function. This is called RTL (Register Transfer Level) design, and is a first step of the process flow of the LSI design. However, behavioral design using a behavioral model and the like is previously carried out in some cases, but is omitted for simplification of the description. In such behavioral design, behavioral synthesis is executed giving constraints such as a clock cycle and latency. Although omitted in FIG. 2A, logic verification is also carried out on an LSI described in the RTL in the RTL design stage, and the RTL description is amended until there is no more failure in the circuit.

[Step S2] Next, logic synthesis is carried out after the end of the RTL design. Logic synthesis is a process for creating a netlist being circuit information composed of actual circuit elements from the RTL description. In logic synthesis, conditions of synthesis constraints such as an appropriate timing constraint are set, and synthesis is carried out such that a circuit composed of the created netlist operates at a desired operation frequency. When the logic synthesis ends, layout design is carried out by processes from Step S3 and onward using the created netlist.

[Step S3] The designer creates a floorplan to decide the rough placement of main modules constituting the LSI. In floorplanning, hierarchical partitioning is performed for each module on which layout is carried out and a decision is made on where in an area to be laid out the partitioned module is arranged. Here, a module in a lower layer upon hierarchical partitioning is called a "subchip." With hierarchical partitioning, it is possible to estimate crosstalk in a subchip independently in Step S5 to be described below. The execution subsequently transits to Step S4.

[Step S4] After floorplanning and hierarchical partitioning end, the design enters the design of subchips partitioned into the layers.

Figure 2B:
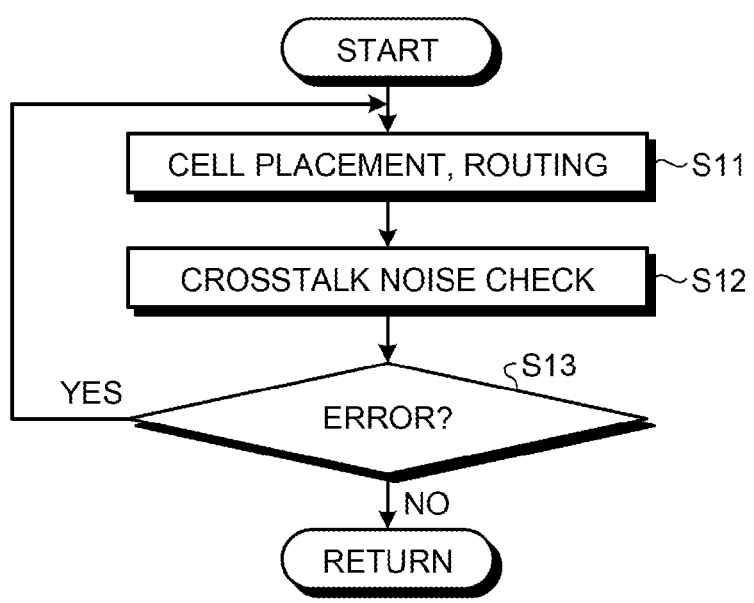
FIG. 2B is a diagram illustrating the design of each subchip.

Here, the design of subchips in Step S4 will be described with reference to FIG. 2B. FIG. 2B is a diagram illustrating the design of the subchips.

[Step S11] As illustrated in FIG. 2B, firstly a designer operates a design support apparatus 10, which is described below, to perform cell placement and routing on the LSI in the design of the subchips. The execution subsequently transits to Step S12.

[Step S12] The designer inputs an instruction to execute a crosstalk noise check into the design support apparatus 10 to perform a crosstalk noise check on an actual wiring result for each subchip. In addition, the designer inputs design data containing data on nets of a subchip into the design support apparatus 10. The execution subsequently transits to Step S13. Layout verification and timing verification other than the crosstalk noise check are omitted in the flow of FIG. 2B.

[Step S13] If receiving a notice that there exists an error from the design support apparatus 10 as a consequence of the design support apparatus 10 executing the crosstalk noise check (Yes at Step S13), the designer reviews the placement of cells and routing, transiting to Step S11 again. If a notice that there exists no error is received from the design support apparatus 10 (No at Step S13), the execution transits to Step S5 illustrated in FIG. 2A. In this manner, the designer redesigns the subchips such that the influence of crosstalk noise is suppressed while reviewing each subchip until there are no more errors in the crosstalk noise check. For example, the designer arranges a shield wire such as a power line between two signal lines, and adjusts the strength of the signal output of a driver cell to transmit a signal to a signal line.

[Step S5] The designer completes the design of each subchip, suppresses the occurrence of an error in crosstalk noise on a subchip basis, and then carries out the entire LSI design. In the entire LSI design, the placement and routing processes are performed in an upper layer including the subchips.

[Step S6] When the entire design ends, the designer performs a crosstalk noise check. The crosstalk noise check in this step performs a check including crosstalk noise between the layers. Specifically, the designer inputs an instruction to execute a crosstalk noise check into the design support apparatus 10 at the time of the end of the design of the subchips, or at the time when the design of part of the subchips is not complete. In addition, the designer inputs into the design support apparatus 10 design data containing data on the nets of the entire chip (the entire LSI). Moreover, the design support apparatus 10 treats a subchip whose design is not complete as a black box, and performs a crosstalk noise check.

Figure 3:
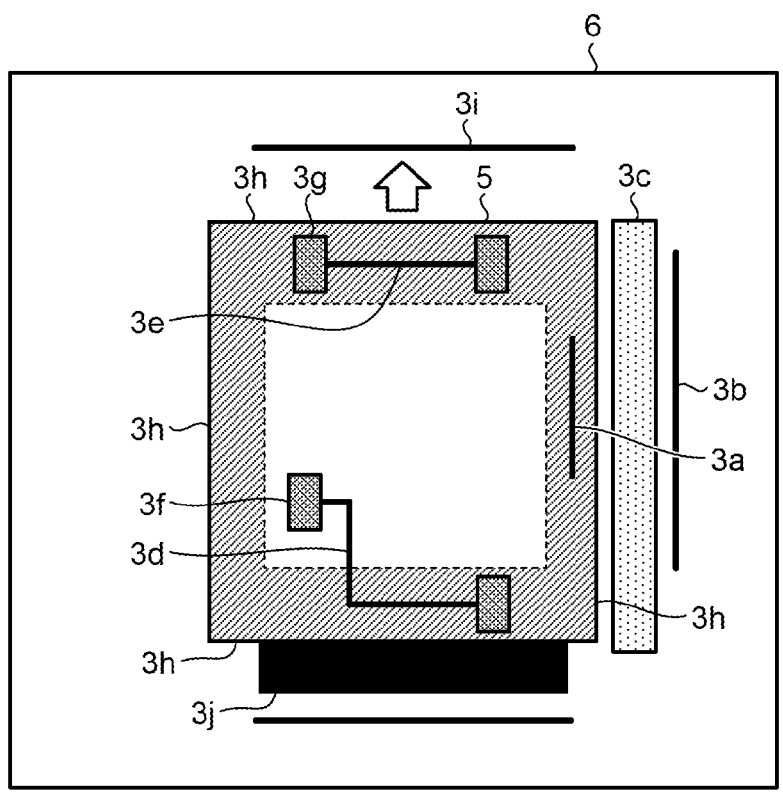
FIG. 3 is a diagram illustrating an example of a method for reviewing the design of each subchip.

[Step S7] If there exists an error in the entire chip as a consequence of the design support apparatus 10 performing the crosstalk noise check (Yes at Step S7), the execution transits to Step S4, and the design of the subchips is reviewed again. FIG. 3 is a diagram illustrating an example of a method for reviewing the design of the subchips. FIG. 3 illustrates a chip 6 including a subchip 5. As illustrated in FIG. 3, the designer, for example, arranges a shield wire 3c such as a power line between two signal lines 3a and 3b, and adjusts the strength of the signal output of driver cells 3f and 3g that transmit signals to signal lines 3d and 3e. Moreover, the designer arranges a signal line 3i a predetermined distance away from a boundary 3h of the subchip 5 in the chip 6 belonging to a layer immediately above a layer to which the subchip 5 belongs since there may exist a signal line in the vicinity of the boundary 3h of the subchip 5. Moreover, the designer sets, in the chip 6, an area 3j corresponding to an area in the vicinity of the boundary 3h of the subchip 5 as a wiring prohibited area that prohibits signal wiring since there may exist a signal line in the vicinity of the boundary 3h of the subchip 5. If there exists no error in the crosstalk noise check again in the entire chip (No at Step S7), the execution transits to Step S8.

[Step S8] The designer creates data to manufacture the LSI at the time when there are no more errors in the crosstalk noise check in the entire LSI, and proceeds to the manufacture of the LSI, starting the actual mask making process.

The crosstalk noise check of Step S12 can be omitted. In this case, the crosstalk noise check of each subchip is also performed in Step S6.

Hereinafter, a description will be given of the design support apparatus 10 that executes a crosstalk noise check. The design support apparatus 10 can perform also cell placement, routing, and the like of an LSI by being operated by a designer and the like.

Configuration of Design Support Apparatus

Figure 4:
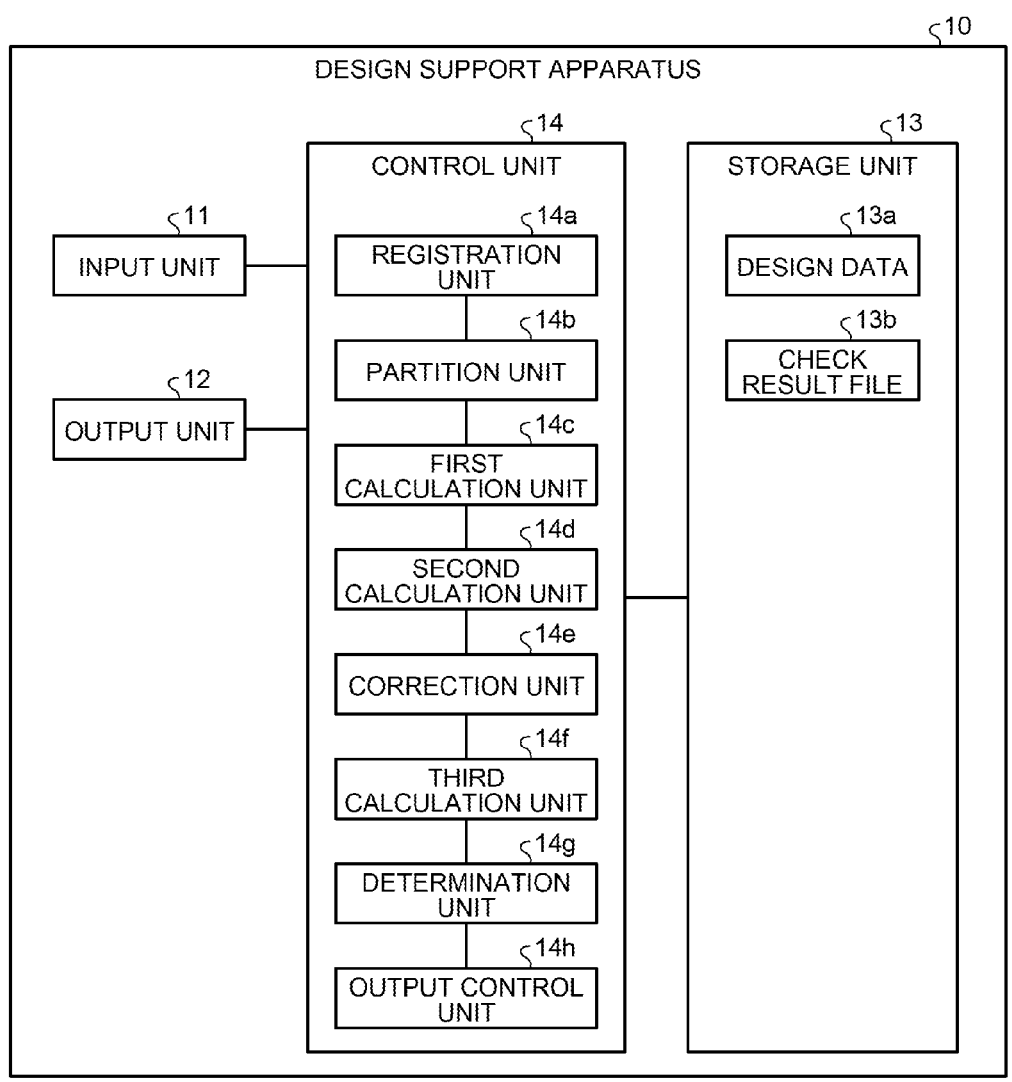
FIG. 4 is a diagram illustrating an example of a functional configuration of a design support apparatus according to an embodiment.

A description will be given of the design support apparatus 10 according to the embodiment. FIG. 4 is a diagram illustrating an example of a functional configuration of the design support apparatus according to the embodiment. As illustrated in FIG. 4, the design support apparatus 10 includes an input unit 11, an output unit 12, a storage unit 13, and a control unit 14.

The input unit 11 inputs various pieces of information into the control unit 14. For example, the input unit 11 accepts from a designer an instruction to execute a crosstalk noise check, and inputs the instruction into the control unit 14. Moreover, the input unit 11 accepts from a designer design data containing data on the nets of a subchip or data on the nets of an entire chip, and inputs the accepted design data into the control unit 14. Examples of devices of the input unit 11 include a keyboard and a mouse.

The output unit 12 outputs various pieces of information. For example, the output unit 12 displays the content of a check result file 13b to be described below by the control of an output control unit 14h to be described below. Examples of devices of the output unit 12 include display devices including a monitor and a liquid crystal display.

The storage unit 13 stores therein various programs to be executed by the control unit 14. Moreover, design data 13a are stored in the storage unit 13 by a registration unit 14a to be described below. Moreover, the storage unit 13 stores the check result file 13b therein.

The design data 13a will be described. The design data 13a are, for example, data containing data on the nets of a subchip, or data containing data on the nets of an entire chip. The design data 13a contain coordinate data indicating the positions of two terminals of each net and a signal line connected to the two terminals. Moreover, examples of such two terminals include a driver cell that transmits a signal to the signal line, and a receiver cell that receives data transmitted to the signal line. Moreover, the design data 13a contain data indicating the types of signal lines, for example, the types of a power line and the like.

The check result file 13b will be described. The check result file 13b is, for example, a file where a check result of a crosstalk noise check by a determination unit 14g to be described below is registered.

The storage unit 13 is, for example, a semiconductor memory device such as a flash memory, or a storage device such as a hard disk or an optical disc. The storage unit 13 is not limited to the above types of storage devices, but may be a RAM (Random Access Memory), or a ROM (Read Only Memory).

The control unit 14 includes an internal memory for storing a program and control data that specify various processing procedures, and executes various processes by them. The control unit 14 includes the registration unit 14a, a partition unit 14b, a first calculation unit 14c, a second calculation unit 14d, a correction unit 14e, a third calculation unit 14f, the determination unit 14g, and the output control unit 14h.

The registration unit 14a registers various pieces of information. For example, if being inputted thereto the design data 13a from the input unit 11, the registration unit 14a stores the inputted design data 13a in the storage unit 13, and registers the design data 13a.

If a power line runs parallel between two signal lines in an LSI, the partition unit 14b partitions a direction in which the two signal lines extend into a plurality of sections based on the position of the power line running parallel. One form of the partition unit 14b will be described. The partition unit 14b acquires the design data 13a from the storage unit 13 first. The partition unit 14b then determines whether or not there are nets that have not been selected as Victim nets among nets contained in the acquired design data 13a. Here, "Victim net" indicates a net including a signal line that is influenced by crosstalk noise. Moreover, the partition unit 14b determines whether or not there are nets that have not been selected as Victim nets among the nets contained in the acquired design data 13a, whenever a check result is registered in the check result file 13b by the determination unit 14g to be described below.

If there are nets that have not been selected as Victim nets, the partition unit 14b selects one of the nets that have not been selected as Victim nets. The partition unit 14b then determines whether or not there are unselected Victim lines among Victim lines of the selected Victim net. Here, "Victim line" indicates a signal line that is influenced by the crosstalk noise of a Victim net. If there are unselected Victim lines, the partition unit 14b selects one of the unselected Victim lines.

Next, the partition unit 14b extracts Aggressor nets corresponding to the selected Victim net from among the nets contained in the design data 13a other than the selected Victim net. Here, "Aggressor net" indicates a net including a signal line that exerts the influence of crosstalk noise. Each net contained in the design data 13a can be both of a Victim net and an Aggressor net.

Figure 5:
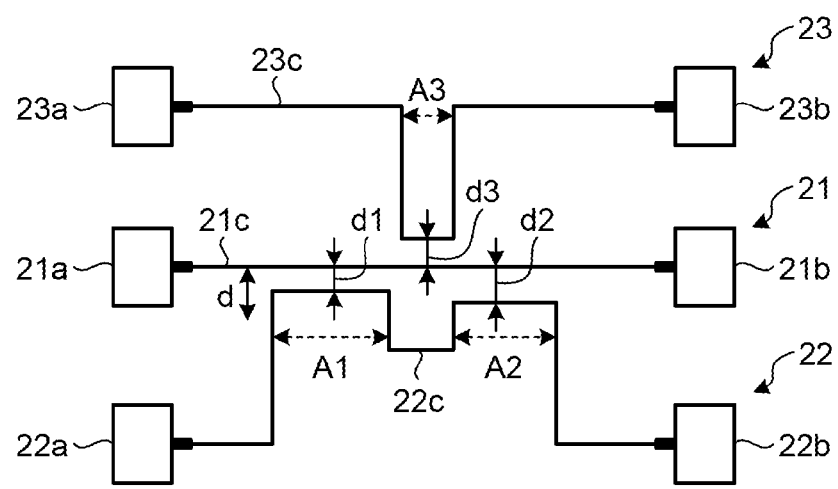
FIG. 5 is a diagram illustrating an example of a method for extracting an Aggressor net.

A description will be given of an example of the method for extracting an Aggressor net. For example, the partition unit 14b extracts a net including a signal line that exists within a predetermined area from the selected Victim line, as an Aggressor net corresponding to the Victim net. FIG. 5 is a diagram illustrating an example of the method for extracting an Aggressor net. The example of FIG. 5 indicates a Victim net 21 including a driver cell 21a, a receiver cell 21b, and a signal line 21c connected to the driver cell 21a and the receiver cell 21b. In the example of FIG. 5, firstly, the partition unit 14b identifies a signal line including a section where a distance from the signal line 21c is less than or equal to "d." The partition unit 14b then extracts, as an Aggressor net, a net including the identified signal line, and terminals connected to the identified signal line. For example, in the example of FIG. 5, the partition unit 14b identifies a signal line 22c including a section A1 where a distance from the signal line 21c is "d1" (≤"d"), and a section A2 where a distance from the signal line 21c is "d2" (≤"d"). The partition unit 14b then extracts, as an Aggressor net, a net 22 including the identified signal line 22c, and a driver cell 22a and a receiver cell 22b that are connected to the signal line 22c. Moreover, in the example of FIG. 5, the partition unit 14b identifies a signal line 23c including a section A3 where a distance from the signal line 21c is "d3" (≤"d"). The partition unit 14b then extracts, as an Aggressor net, a net 23 including the identified signal line 23c, and a driver cell 23a and a receiver cell 23b that are connected to the signal line 23c.

Next, the partition unit 14b determines whether or not there are unselected Aggressor nets among the extracted Aggressor nets. If there are no unselected Aggressor nets, the partition unit 14b performs again the above-mentioned process to determine whether or not there are unselected Victim lines among Victim lines of the selected Victim net. The partition unit 14b then performs the processes after such a process again. Moreover, the partition unit 14b determines whether or not there are unselected Aggressor nets among the extracted Aggressor nets also when an Aggressor noise value is stored in the internal memory by the third calculation unit 14f to be described below.

On the other hand, if there are unselected Aggressor nets, the partition unit 14b selects one of the unselected Aggressor nets. The partition unit 14b subsequently determines whether or not there are unselected Aggressor lines among Aggressor lines of the selected Aggressor net. Here, "Aggressor line" indicates a signal line that exerts the influence of the crosstalk noise of an Aggressor net. Moreover, whenever an inter-line noise value is added to an Aggressor noise value by the third calculation unit 14f to be described below, the partition unit 14b determines whether or not there are unselected Aggressor lines among the Aggressor lines of the selected Aggressor net.

If there are unselected Aggressor lines, the partition unit 14b selects one of the unselected Aggressor lines.

The partition unit 14b then determines whether or not a power line exists between the two signal lines of the selected Victim and Aggressor lines based on the content of the design data 13a. More specifically, the partition unit 14b determines whether or not a power line exists in a section where the selected Victim and Aggressor lines mutually exist within a predetermined area. If a power line exists, the partition unit 14b determines whether or not the power line fully covers at least one signal line of the two signal lines. Here, an example of such a determination method will be described with reference to FIGS. 6A and 6B.

Figure 6A:
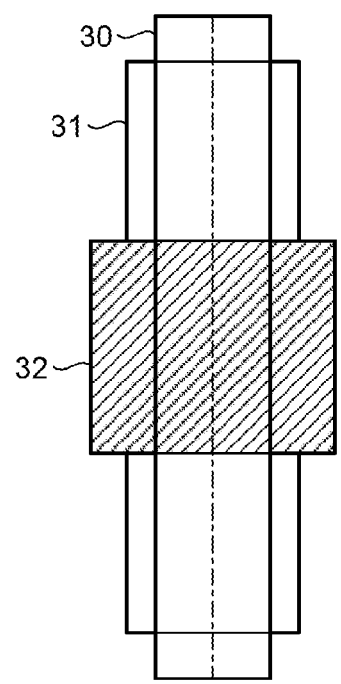
FIG. 6A is a diagram illustrating an example of a process to be executed by the design support apparatus according to the embodiment.
Figure 6B:
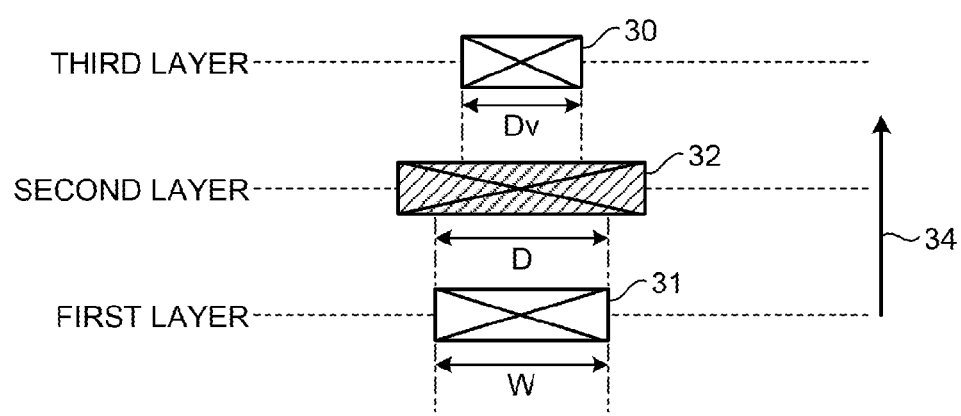
FIG. 6B is a diagram illustrating an example of the process to be executed by the design support apparatus according to the embodiment.

FIGS. 6A and 6B are diagrams illustrating an example of a process to be executed by the design support apparatus according to the embodiment. FIG. 6A is a plan view of a selected Victim line 30, a selected Aggressor line 31, and a power line 32 when the power line 32 exists between the Victim line 30 and the Aggressor line 31. FIG. 6B is a cross-sectional view of the selected Victim line 30, the selected Aggressor line 31, and the power line 32 when the power line 32 exists between the Victim line 30 and the Aggressor line 31.

In the case of FIGS. 6A and 6B, the partition unit 14b projects a line width Dv (nm) of the Victim line 30 in a direction orthogonal to a direction 34 in which layers are arranged onto a plane where the direction 34 is set as a normal vector. Moreover, a line width of the power line 32 in the direction orthogonal to the direction 34 in which the layers are arranged is projected onto the plane where the direction 34 is set as the normal vector. The partition unit 14b then determines whether or not the entire line width Dv of the Victim line 30 that has been projected onto the plane is included in the line width, projected onto the plane, of the power line 32. The partition unit 14b determines that the power line 32 fully covers the Victim line 30 if the entire line width Dv, projected onto the plane, of the Victim line 30 is included in the line width, projected onto the plane, of the power line 32. On the other hand, the partition unit 14b determines that the power line 32 does not fully cover the Victim line 30 if the entire line width Dv, projected onto the plane, of the Victim line 30 is not included in the line width, projected onto the plane, of the power line 32.

Figure 6C:
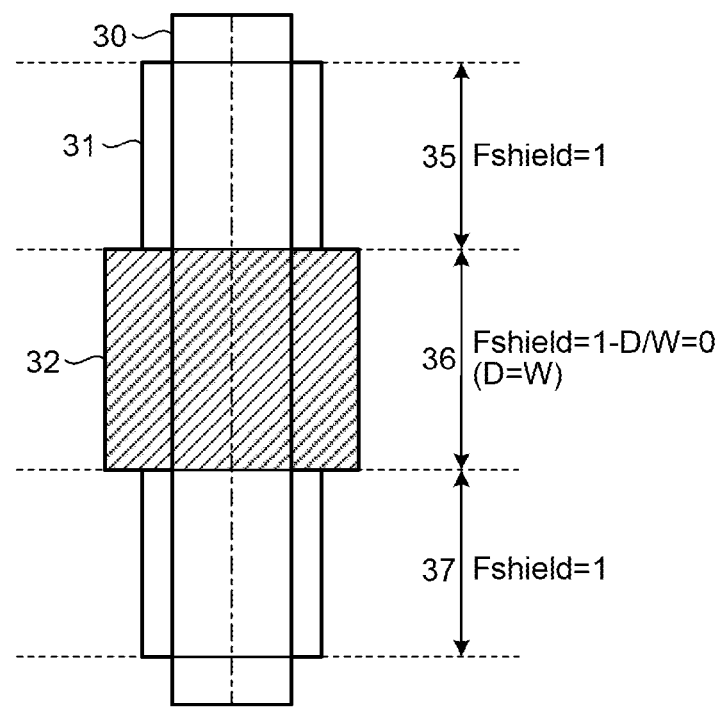
FIG. 6C is a diagram illustrating an example of a process to be executed by the design support apparatus according to the embodiment.

Also for the selected Aggressor line, the partition unit 14b determines whether or not the power line fully covers the Aggressor line in a similar method if the power line is determined to not fully cover the Victim line. If the power line is determined to fully cover at least one signal line of the Victim and Aggressor lines, the partition unit 14b performs the following process. In other words, the partition unit 14b partitions a direction in which the two signal lines in a section where the signal lines mutually exist within the predetermined area extend into a plurality of sections of sections where the power line does not exist and a section where the power line exists, based on the position of the power line. An example of the process of partitioning into a plurality of sections will be described with reference to FIG. 6C. FIG. 6C is a diagram illustrating an example of a process to be executed by the design support apparatus according to the embodiment. In the case illustrated in FIG. 6A, as illustrated in FIG. 6C, the partition unit 14b partitions a direction in which the signal lines 30 and 31 in a section where the signal lines 30 and 31 exist within the predetermined area extend into a plurality of sections of sections 35 and 37 where the power line 32 does not exist and a section 36 where the power line 32 exists.

For each combination of a selected Victim line and a selected Aggressor line, the partition unit 14b then partitions the above-mentioned direction in which the signal lines extend into a plurality of sections of sections where the power line does not exist and a section where the power line exists.

Return to the description of FIG. 4. The first calculation unit 14c calculates a crosstalk noise value when the power line does not run parallel, for each of the plurality of sections partitioned by the partition unit 14b. One form of the first calculation unit 14c will be described. Firstly, the first calculation unit 14c determines whether or not all of the plurality of sections partitioned by the partition unit 14b has been selected. Moreover, the first calculation unit 14c determines whether or not all of the plurality of sections partitioned by the partition unit 14b has been selected also when a corrected crosstalk noise value is added to an inter-line noise value by the third calculation unit 14f to be described below.

If not selected, the first calculation unit 14c selects one of the unselected sections. For example, in the case of FIG. 6C, if none of the sections 35 to 37 has been selected, the section 35 is selected. The first calculation unit 14c then calculates a crosstalk noise value (section noise value) assuming that there is no power line in the selected section. For example, the first calculation unit 14c calculates the value of the product of a length L, a coefficient K, and a value C as a crosstalk noise value of the section (a section noise value). Here, the length L is a length of a segment of a signal line in the section. Moreover, the coefficient K is a coefficient based on a strength at which signals of driver cells of a Victim net and an Aggressor net are transmitted. Moreover, the value C is a value derived from a relaxation function based on a distance, capacitance, and resistance between the Victim net and the Aggressor net.

The first calculation unit 14c then calculates a crosstalk noise value when the power line does not run parallel (a section noise value), for each partitioned section.

Return to the description of FIG. 4. The second calculation unit 14d calculates a coefficient Fshield that becomes larger with decrease in the area of the power line included in an area between the two signal lines based on a relative positional relationship between the two signal lines and the power line in a section, for each of the plurality of partitioned sections. One form of the second calculation unit 14d will be described. Firstly, the second calculation unit 14d performs the following process in the section selected by the first calculation unit 14c. In other words, the second calculation unit 14d projects a line width in a direction orthogonal to a direction in which the layers are arranged, the line width being of the signal line other than the signal line determined to be fully covered by the power line out of the two signal lines, onto a plane where the direction in which the layers are arranged is set as a normal vector. Moreover, the second calculation unit 14d projects a line width of the power line in the direction orthogonal to the direction in which the layers are arranged, onto the plane where the direction in which the layers are arranged is set as the normal vector, in the section selected by the first calculation unit 14c. The second calculation unit 14d then calculates a length D (nm) of the line width, projected onto the plane, of the power line, the length D being included in a line width W (nm), projected onto the plane, of the signal line. For example, the second calculation unit 14d calculates the length D (nm) of the line width, projected onto the plane, of the power line 32, the length D being included in the line width W (nm), projected onto the plane, of the Aggressor line 31, in the section, illustrated in FIG. 6B, where the power line exists. If the section selected by the first calculation unit 14c is a section where the power line does not exist, the second calculation unit 14d calculates "zero" as the length D since the power line does not exist.

Next, the second calculation unit 14d calculates the coefficient Fshield by the following equation (1).

$$F\text{shield} = 1 - D/W \tag{1}$$

Figure 7:
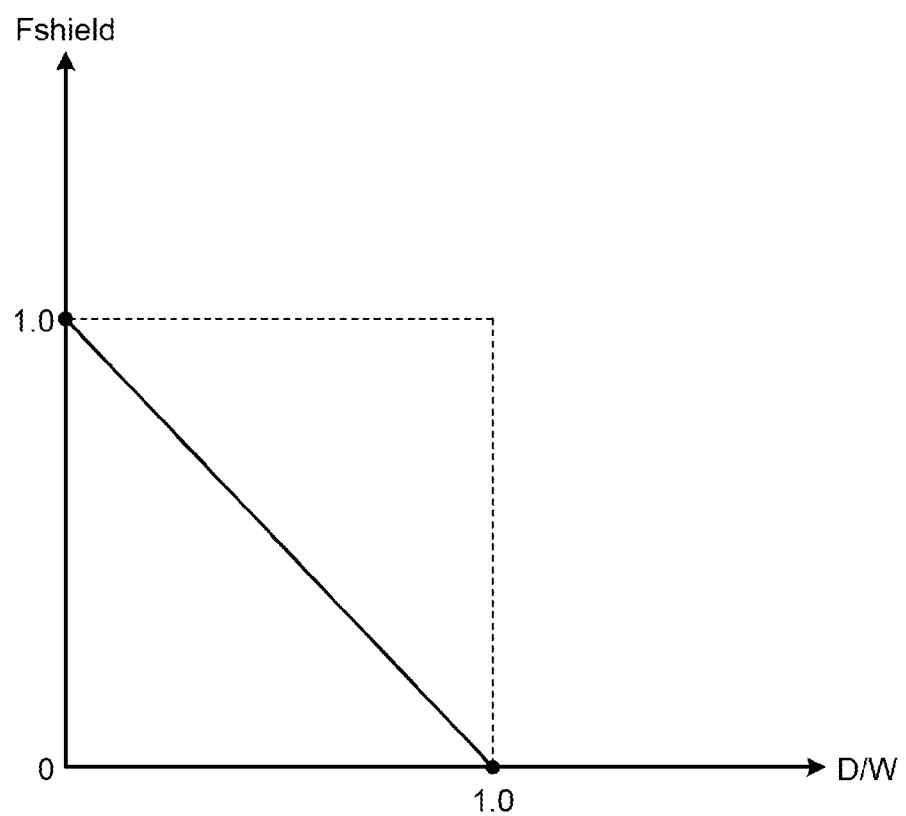
FIG. 7 is a graph illustrating an example of a relationship between a value of "D/W" and Fshield.

In the case of FIG. 6B, Fshield=1−1=0, where D=W. Moreover, if the section selected by the first calculation unit 14c is a section where the power line does not exist, Fshield=1−0=1 where D=0. FIG. 7 is a graph illustrating an example of a relationship between the value of "D/W" and Fshield. In the above equation (1), the value of "D/W" is a value of zero or more and one or less. Therefore, the value of Fshield is zero or more and one or less as illustrated in FIG. 7. Moreover, it can be said from the graph of FIG. 7 that a function of Fshield obtained in accordance with the value of "D/W" has a linearity.

The second calculation unit 14d then calculates the coefficient Fshield for each section selected by the first calculation unit 14c, that is, for each partitioned section.

Figure 8A:
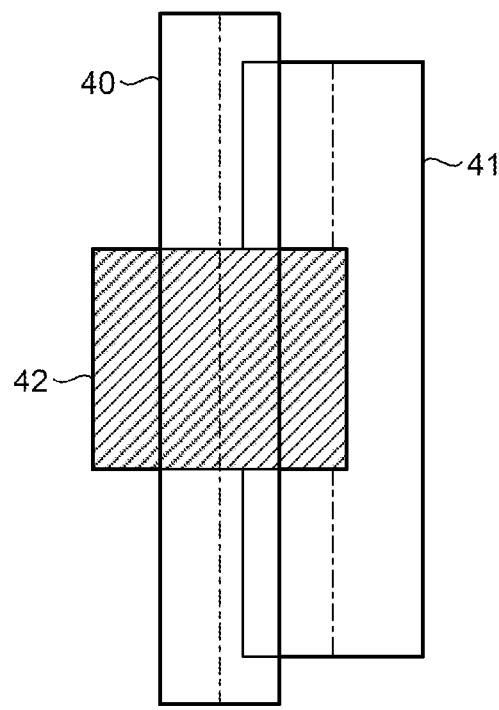
FIG. 8A is a diagram illustrating an example of a process to be executed by the design support apparatus according to the embodiment.
Figure 8B:
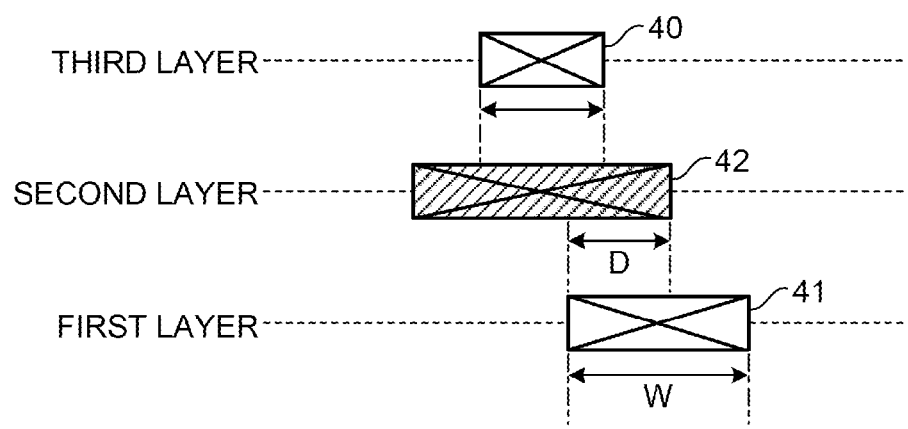
FIG. 8B is a diagram illustrating an example of the process to be executed by the design support apparatus according to the embodiment.

Here, the Fshield value when not D=W will be described with reference to FIGS. 8A to 8C and 9A to 9C. FIGS. 8A and 8B are diagrams illustrating an example of a process to be executed by the design support apparatus according to the embodiment. FIG. 8A is a plan view of a selected Victim line 40, a selected Aggressor line 41, and a power line 42 when the power line 42 exists between the Victim line 40 and the Aggressor line 41. FIG. 8B is a cross-sectional view of the selected Victim line 40, the selected Aggressor line 41, and the power line 42 when the power line 42 exists between the Victim line 40 and the Aggressor line 41.

Figure 8C:
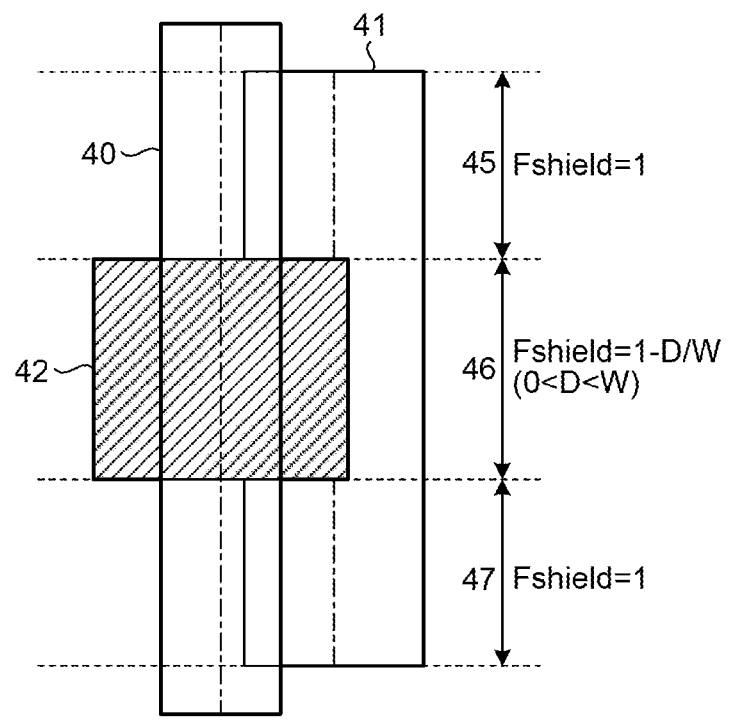
FIG. 8C is a diagram illustrating an example of a process to be executed by the design support apparatus according to the embodiment.

In the case of FIGS. 8A and 8B, the partition unit 14b projects a line width of the Victim line 40 in a direction orthogonal to a direction in which the layers are arranged onto a plane where the direction in which the layers are arranged is set as a normal vector. Moreover, a line width of the power line 42 in the direction orthogonal to the direction in which the layers are arranged is projected onto the plane where the direction in which the layers are arranged is set as the normal vector. The partition unit 14b then determines whether or not the entire line width, projected onto the plane, of the Victim line 40 is included in the line width, projected onto the plane, of the power line 42. In the case of FIGS. 8A and 8B, the partition unit 14b determines that the power line 42 fully covers the Victim line 40 by determining that the entire line width, projected onto the plane, of the Victim line 40 is included in the line width, projected onto the plane, of the power line 42. FIG. 8C is a diagram illustrating an example of a process to be executed by the design support apparatus according to the embodiment. In the case of FIG. 8A, as illustrated in FIG. 8C, the partition unit 14b partitions a direction in which the signal lines 40 and 41 in a section where the signal lines 40 and 41 exist within the predetermined area extend into a plurality of sections of sections 45 and 47 where the power line 42 does not exist and a section 46 where the power line 42 exists.

The second calculation unit 14d then calculates Fshield=1−0=1 for the sections 45 and 47 where D=0. Moreover, the second calculation unit 14d calculates Fshield=1−D/W that is more than zero and less than one for the section 46 where 0<D<W, which leads to 0<D/W<1.

Figure 9A:
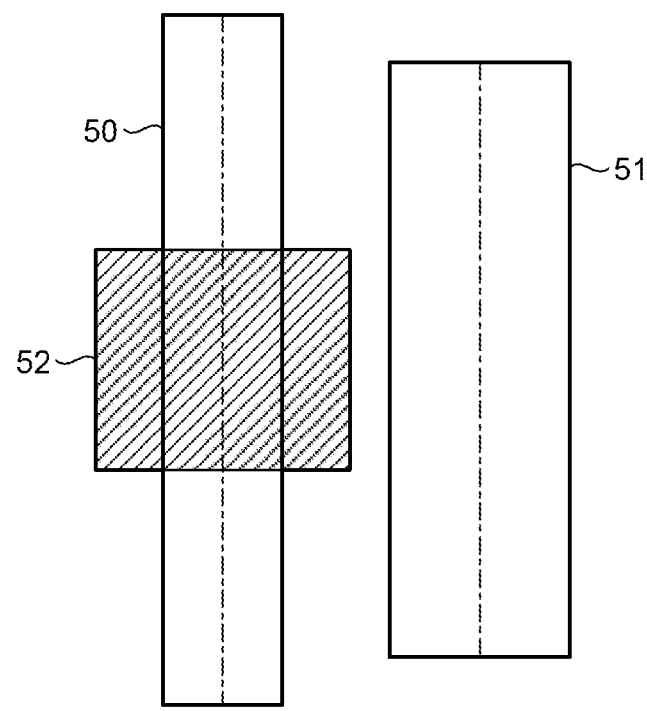
FIG. 9A is a diagram illustrating an example of a process to be executed by the design support apparatus according to the embodiment.
Figure 9B:
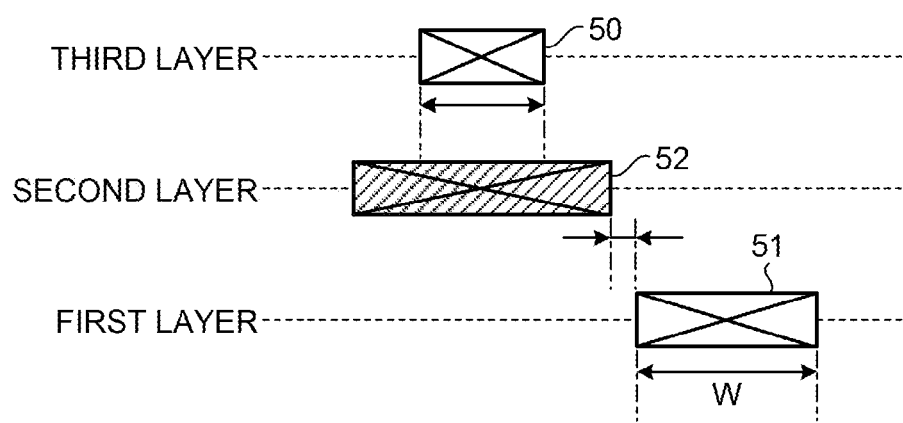
FIG. 9B is a diagram illustrating an example of the process to be executed by the design support apparatus according to the embodiment.

FIGS. 9A and 9B are diagrams illustrating an example of a process to be executed by the design support apparatus according to the embodiment. FIG. 9A is a plan view of a selected Victim line 50, a selected Aggressor line 51, and a power line 52 when the power line 52 exists between the Victim line 50 and the Aggressor line 51. FIG. 9B is a cross-sectional view of the selected Victim line 50, the selected Aggressor line 51, and the power line 52 when the power line 52 exists between the Victim line 50 and the Aggressor line 51.

Figure 9C:
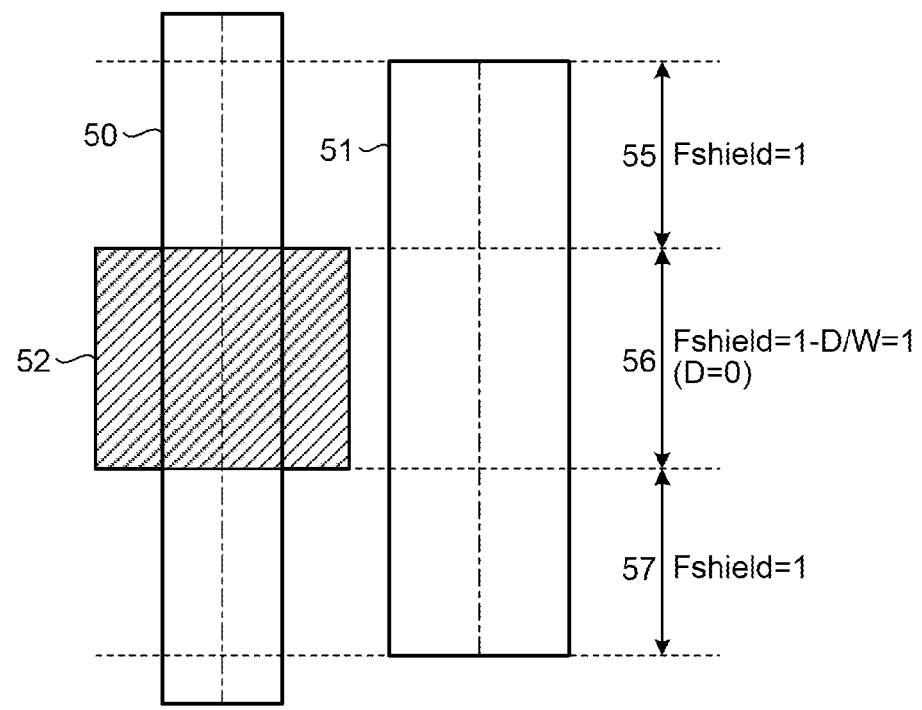
FIG. 9C is a diagram illustrating an example of a process to be executed by the design support apparatus according to the embodiment.

In the case of FIGS. 9A and 9B, the partition unit 14b projects a line width of the Victim line 50 in a direction orthogonal to a direction in which the layers are arranged onto a plane where the direction in which the layers are arranged is set as a normal vector. Moreover, a line width of the power line 52 in the direction orthogonal to the direction in which the layers are arranged is projected onto the plane where the direction in which the layers are arranged is set as the normal vector. The partition unit 14b then determines whether or not the entire line width, projected onto the plane, of the Victim line 50 is included in the line width, projected onto the plane, of the power line 52. In the case of FIGS. 9A and 9B, the partition unit 14b determines that the power line 52 fully covers the Victim line 50 by determining that the entire line width, projected onto the plane, of the Victim line 50 is included in the line width, projected onto the plane, of the power line 52. FIG. 9C is a diagram illustrating an example of a process to be executed by the design support apparatus according to the embodiment. In the case of FIG. 9A, as illustrated in FIG. 9C, the partition unit 14b partitions a direction in which the signal lines 50 and 51 in a section where the signal lines 50 and 51 exist within the predetermined area extend into a plurality of sections of sections 55 and 57 where the power line 52 does not exist and a section 56 where the power line 52 exists.

The second calculation unit 14d then calculates Fshield=1−0=1 for the sections 55 and 57 where D=0. Moreover, the second calculation unit 14d calculates Fshield=1−0=1 for the section 56 where D=0.

Return to the description of FIG. 4. The correction unit 14e corrects a crosstalk noise value calculated by the first calculation unit 14c and corresponding to a section, using the coefficient Fshield corresponding to the section, for each of the plurality of partitioned sections. One form of the correction unit 14e will be described. For example, as expressed by the following equation (2), the correction unit 14e sets, as a new crosstalk noise value, the product of a crosstalk noise value N calculated by the first calculation unit 14c and corresponding to a section, and Fshield corresponding to the section, and accordingly corrects the crosstalk noise value.

$$\text{Crosstalk noise value} = \text{crosstalk noise value } N \times F\text{shield} \quad (2)$$

As described above, the correction unit 14e then corrects the crosstalk noise value for each partitioned section.

The third calculation unit 14f calculates a total of the corrected crosstalk noise values corresponding respectively to the plurality of partitioned sections as a crosstalk noise value between two signal lines. For example, the third calculation unit 14f performs the following process on an inter-line noise value corresponding to a combination of a selected Victim line and a selected Aggressor line among a plurality of inter-line noise values respectively for the combinations of a Victim line and an Aggressor line. In other words, whenever the crosstalk noise value is corrected by the correction unit 14e, the third calculation unit 14f adds the corrected crosstalk noise value to the inter-line noise value. In this manner, the third calculation unit 14f calculates an inter-line noise value between a selected Victim line and a selected Aggressor line, and calculates the calculated inter-line noise value as a crosstalk noise value.

Moreover, if the partition unit 14b determines that a power line does not exist, and if the partition unit 14b determines that the power line does not fully cover both of two signal lines, the third calculation unit 14f performs the following process. In other words, the third calculation unit 14f calculates an inter-line noise value corresponding to a combination of a selected Victim line and a selected Aggressor line. For example, the third calculation unit 14f calculates the value of the product of the above-mentioned length L, coefficient K, and value C as a crosstalk noise value, and calculates the calculated crosstalk noise value as an inter-line noise value.

Whenever an inter-line noise value is calculated, the third calculation unit 14f adds the inter-line noise value to an Aggressor noise value. Here, among a plurality of Aggressor noise values respectively for combinations of a Victim net and an Aggressor net, the inter-line noise value is added to the following Aggressor noise value. In other words, the inter-line noise value is added to an Aggressor noise value corresponding to a combination of the selected Victim net and the selected Aggressor net. In this manner, the third calculation unit 14f calculates the Aggressor noise value of the selected Victim net and the selected Aggressor net. The third calculation unit 14f then calculates the calculated Aggressor noise value as a crosstalk noise value of the selected Victim net and the selected Aggressor net.

Moreover, if the partition unit 14b determines that there are no unselected Aggressor lines, the third calculation unit 14f stores in the internal memory the Aggressor noise value corresponding to the combination of the selected Victim net and the selected Aggressor net.

Return to the description of FIG. 4. The determination unit 14g performs a crosstalk noise check. One form of the determination unit 14g will be described. For example, the determination unit 14g performs the following process if the partition unit 14b determines that there are no unselected Victim lines. In other words, the determination unit 14g compares an Aggressor noise value corresponding to a combination of a selected Victim net and a selected Aggressor net, with a predetermined limiting value. The determination unit 14g then determines that there is no problem if the Aggressor noise value is less than or equal to the predetermined limiting value. On the other hand, the determination unit 14g determines that it is an error if the Aggressor noise value is not less than or equal to the predetermined limiting value. The determination unit 14g then registers the determination result (check result) in the check result file 13b.

The output control unit 14h controls the output of the output unit 12. For example, if the partition unit 14b determines that there are no nets that have not been selected as Victim nets, the output control unit 14h controls the display of the output unit 12 so as to display the check result registered in the check result file 13b.

The control unit 14 is an integrated circuit such as an ASIC (Application Specific Integrated Circuit) or an FPGA (Field Programmable Gate Array), or an electronic circuit such as a CPU (Central Processing Unit) or an MPU (Micro Processing Unit).

Flow of Process

Next, a description will be given of the flow of the process of the design support apparatus 10 according to the embodiment. FIG. 10 is a flowchart illustrating a procedure for the crosstalk noise check process according to the embodiment. Various timings are conceivable as an execution timing of the crosstalk noise check process. For example, the crosstalk noise check process is executed by the control unit 14 if an instruction to execute a crosstalk noise check is inputted from the input unit 11.

As illustrated in FIG. 10, the registration unit 14a stores the inputted design data 13a in the storage unit 13, and registers the design data 13a (Step S100). The partition unit 14b then acquires the design data 13a from the storage unit 13 (Step S101). The partition unit 14b then determines whether or not there are nets that have not been selected as Victim nets among nets included in the acquired design data 13a (Step S102).

If there are nets that have not been selected as Victim nets (Yes at Step S102), the partition unit 14b selects one of the nets that have not been selected as Victim nets (Step S103). The partition unit 14b then determines whether or not there are unselected Victim lines among Victim lines of the selected Victim net (Step S104). If there are unselected Victim lines (Yes at Step S104), the partition unit 14b selects one of the unselected Victim lines (Step S105).

Next, the partition unit 14b extracts Aggressor nets corresponding to the selected Victim net from among nets contained in the design data 13a other than the selected Victim net (Step S106). Next, the partition unit 14b determines whether or not there are unselected Aggressor nets among the extracted Aggressor nets (Step S107). If there are no unselected Aggressor nets (No at Step S107), the execution returns to Step S104.

On the other hand, if there are unselected Aggressor nets (Yes at Step S107), the partition unit 14b selects one of the unselected Aggressor nets (Step S108). The partition unit 14b subsequently determines whether or not there are unselected Aggressor lines among Aggressor lines of the selected Aggressor net (Step S109).

If there are unselected Aggressor lines (Yes at Step S109), the partition unit 14b selects one of the unselected Aggressor lines (Step S110). The partition unit 14b and the like execute an inter-line noise value calculation process, which is described below (Step S111). The third calculation unit 14f then adds an inter-line noise value calculated by the inter-line noise value calculation process to an Aggressor noise value (Step S112), and the execution returns to Step S109.

Moreover, if there are no unselected Aggressor lines (No at Step S109), the third calculation unit 14f stores in the internal memory an Aggressor noise value corresponding to a combination of the selected Victim net and the selected Aggressor net (Step S113). The execution then returns to Step S107.

Moreover, if there are no unselected Victim lines (No at Step S104), the determination unit 14g performs the following process. In other words, the determination unit 14g compares the Aggressor noise value corresponding to the combination of the selected Victim net and the selected Aggressor net, with the predetermined limiting value. The determination unit 14g then determines that there is no problem if the Aggressor noise value is less than or equal to the predetermined limiting value. On the other hand, the determination unit 14g determines that it is an error if the Aggressor noise value is less than or equal to the predetermined limiting value (Step S114). The determination unit 14g then registers the determination result (check result) in the check result file 13b (Step S115), and the execution returns to Step S102.

Moreover, if there are no nets that have not been selected as Victim nets (No at Step S102), the output control unit 14h controls the display of the output unit 12 so as to display the check result registered in the check result file 13b (Step S116), and ends the process.

Figure 11:
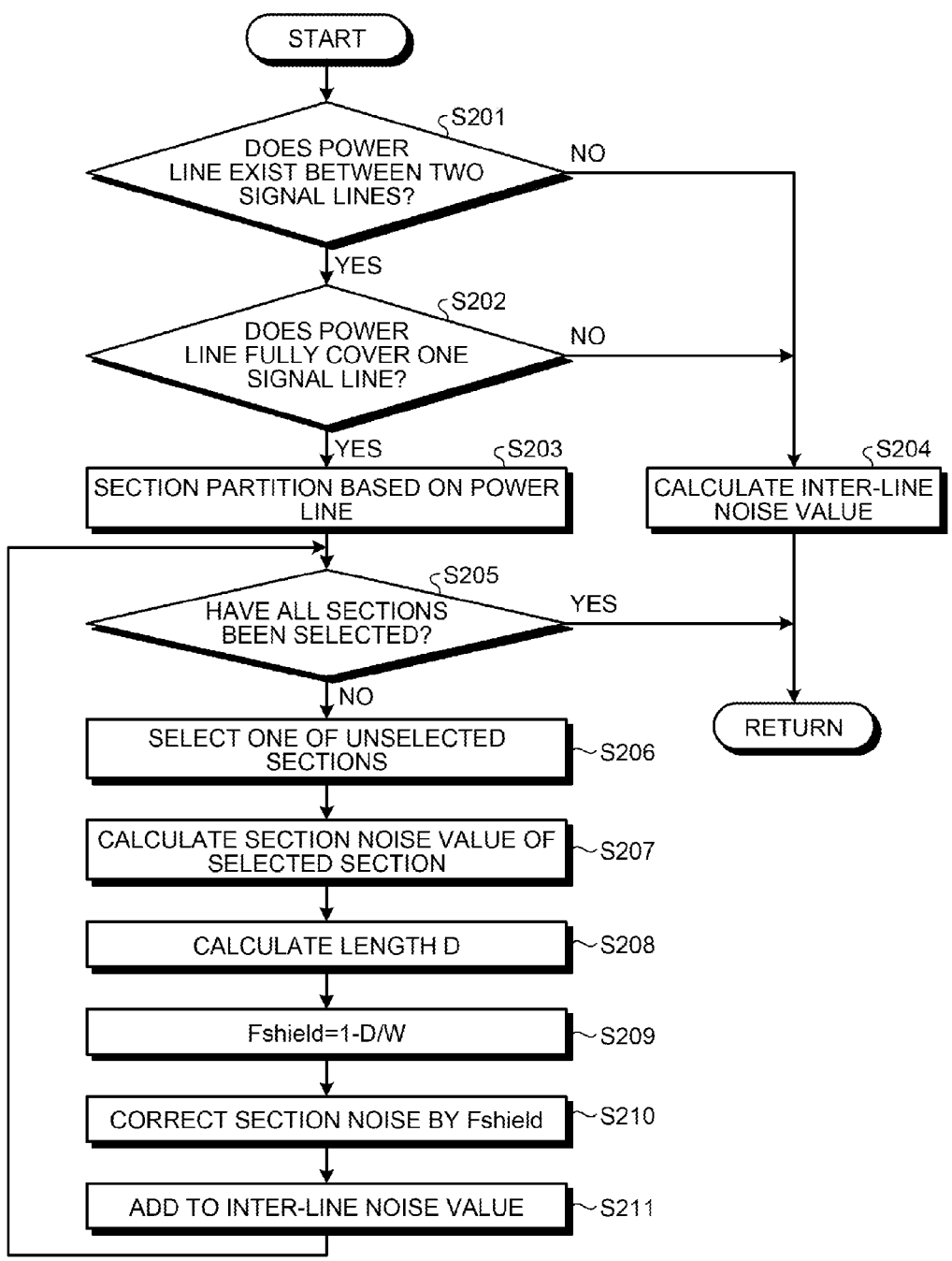
FIG. 11 is a flowchart illustrating a procedure for an inter-line noise value calculation process according to the embodiment.

FIG. 11 is a flowchart illustrating a procedure for the inter-line noise value calculation process according to the embodiment. As illustrated in FIG. 11, the partition unit 14b determines whether or not a power line exists between two signal lines of a selected Victim line and a selected Aggressor line based on the content of the design data 13a (Step S201). If a power line exists (Yes at Step S201), the partition unit 14b determines whether or not the power line fully covers at least one signal line of the two signal lines (Step S202).

If the power line fully covers at least one signal line of the Victim and Aggressor lines (Yes at Step S202), the partition unit 14b performs the following process. In other words, the partition unit 14b partitions a direction in which the two signal lines in a section where the signal lines mutually exist within the predetermined area extend into a plurality of sections of sections where the power line does not exist and a section where the power line exists, based on the position of the power line (Step S203).

The first calculation unit 14c then determines whether or not all of the plurality of sections partitioned by the partition unit 14b has been selected (Step S205). If selected, the first calculation unit 14c stores the process result in the internal memory and returns. If not selected (No at Step S205), the first calculation unit 14c selects one of the unselected sections (Step S206). The first calculation unit 14c then calculates a section noise value assuming there is no power line in the selected section (Step S207).

The second calculation unit 14d then projects a line width of the signal line out of the two signal lines other than the signal line that has been determined to be fully covered by the power line, the line width being in a direction orthogonal to a direction in which the layers area arranged, onto a plane where the direction in which the layers are arranged is set as a normal vector. Moreover, the second calculation unit 14d projects a line width of the power line in the direction orthogonal to the direction in which the layers are arranged, onto the plane where the direction in which the layers are arranged is set as the normal vector. The second calculation unit 14d then calculates the length D (nm) of the line width, projected onto the plane, of the power line, the length D being included in the line width W (nm), projected onto the plane, of the signal line (Step S208). The second calculation unit 14d calculates D=0 in a section where the power line does not exist.

Next, the second calculation unit 14d calculates the coefficient Fshield by the above equation (1) (Step S209).

As expressed by the above equation (2), the correction unit 14e then sets the product of the crosstalk noise value N corresponding to a section and Fshield corresponding to the section as a new crosstalk noise value and corrects the crosstalk noise value (Step S210).

The third calculation unit 14f performs the following process on an inter-line noise value corresponding to a combination of a selected Victim line and a selected Aggressor line among a plurality of inter-line noise values respectively for the combinations of a Victim line and an Aggressor line. In other words, the third calculation unit 14f adds the corrected crosstalk noise value to the inter-line noise value (Step S211), and the execution returns to Step S205.

Moreover, if a power line does not exist (No at Step S201), and if the power line does not fully cover both of the two signal lines (No at Step S202), the third calculation unit 14f performs the following process. In other words, the third calculation unit 14f calculates an inter-line noise value corresponding a combination of the selected Victim line and the selected Aggressor line (Step S204), stores the process result in the internal memory, and returns.

As described above, if a power line runs parallel between two signal lines in an LSI, the design support apparatus 10 according to the embodiment partitions a direction in which the two signal lines extend into a plurality of sections based on a position of the power line running parallel. Moreover, the design support apparatus 10 calculates a crosstalk noise value when the power line does not run parallel, for each of the plurality of partitioned sections. Moreover, the design support apparatus 10 calculates the coefficient Fshield that becomes larger with decrease in the area of the power line included in an area between the two signal lines based on a relative positional relationship between the two signal lines and the power line in a section, for each of the plurality of partitioned sections. Moreover, the design support apparatus 10 corrects a crosstalk noise value corresponding to a section, using the coefficient Fshield corresponding to the section, for each of the plurality of partitioned sections. Moreover, the design support apparatus 10 calculates a total of the corrected crosstalk noise values corresponding respectively to the plurality of partitioned sections as a crosstalk noise value between the two signal lines. In this manner, in the embodiment, the coefficient Fshield is calculated. The crosstalk noise value is corrected using the coefficient Fshield. A crosstalk noise value between two signal lines is then calculated. Hence, the crosstalk noise check value to be calculated in the embodiment is highly accurate and it is conceivable to be close to an actual value. Hence, in the crosstalk noise check in the embodiment, an increase in the number of error determinations is suppressed. Consequently, with the design support apparatus 10 according to the embodiment, it is possible to reduce the load of layout design since the number of times when work such as extension of a distance between lines is performed at every error determination is suppressed.

Figure 12A:
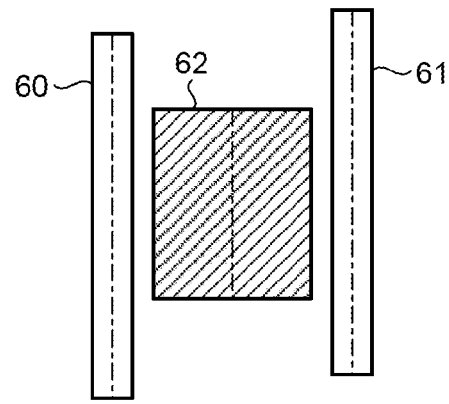
FIG. 12A is a diagram illustrating an example of a process to be executed by the design support apparatus according to the embodiment.
Figure 12B:
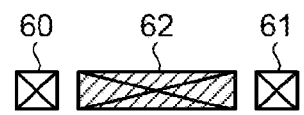
FIG. 12B is a diagram illustrating an example of the process to be executed by the design support apparatus according to the embodiment.
Figure 12C:
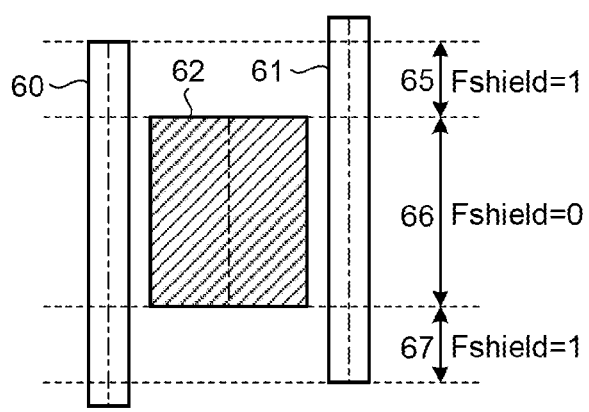
FIG. 12C is a diagram illustrating an example of a process to be executed by the design support apparatus according to the embodiment.

The description has heretofore been given of the embodiment related to the apparatus of the disclosure. However, the present invention can be carried out in various modes other than the above-mentioned embodiment. For example, the description has been given of the case where the above processes are performed on signal lines arranged in a hierarchical direction in the above embodiment. However, the apparatus of the disclosure is not limited to this. FIGS. 12A to 12C are diagrams illustrating an example of a process to be executed by the design support apparatus according to the embodiment. FIG. 12A is a plan view of a selected Victim line 60, a selected Aggressor line 61, and a power line 62 when the power line 62 exists between the Victim line 60 and the Aggressor line 61 in the same layer. FIG. 12B is a cross-sectional view of the selected Victim line 60, the selected Aggressor line 61, and the power line 62 when the power line 62 exists between the Victim line 60 and the Aggressor line 61 in the same layer. In the case of FIGS. 12A and 12B, as illustrated in FIG. 12C, the apparatus of the disclosure can carry out partition into a plurality of sections 65, 66, and 67, and calculate Fshield for the sections 65, 66, and 67 as in the above embodiment. In this case, the design data 13a contains information on the heights of terminals and signal lines.

Moreover, the case of calculating the coefficient Fshield using the equation (1) has been illustrated in the above. However, the apparatus of the disclosure is not limited to this. For example, the apparatus of the disclosure can also calculate the coefficient Fshield by the following equation (3).

$$F\text{shield}=1-\alpha \cdot (D/W) \quad (3)$$

where $\alpha$ represents a predetermined coefficient.

Moreover, among the processes described in the embodiment and the like, all or part of the processes described assuming to be performed automatically can be performed manually.

Moreover, it is possible to arbitrarily divide the process in each step of the processes described in the embodiment and the like into small parts or combine them, in accordance with various loads and usage patterns. Moreover, it is possible to omit the steps.

Moreover, it is possible to change the order of processes in the steps of the processes described in the embodiment and the like, in accordance with various loads and usage patterns.

Moreover, the illustrated components of the apparatus are functionally conceptional, and are not necessarily physically configured as illustrated. In other words, specific states of distribution and integration of the apparatus is not limited to those illustrated, and all or part thereof can be configured by being functionally or physically distributed/integrated in arbitrary units in accordance with various loads and usage patterns.

Design Support Program

Moreover, various processes of the above design support apparatus can be realized by executing a program prepared in advance by a computer system such as a personal computer or a workstation. Hereinafter, an example of a computer that executes a design support program having similar functions to those of the above design support apparatus will be described using FIG. 13.

Figure 13:
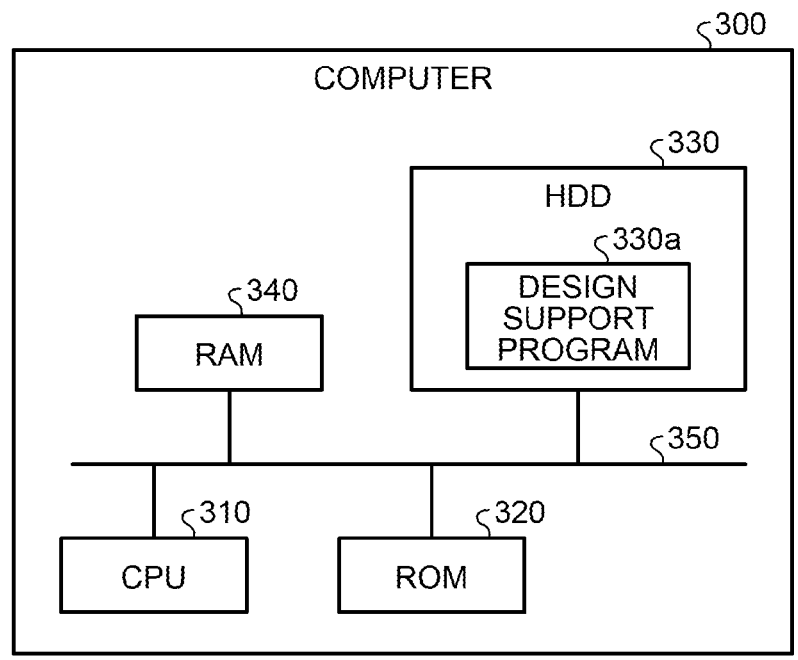
FIG. 13 is a diagram illustrating a computer that executes a design support program.

FIG. 13 is a diagram illustrating a computer that executes the design support program. As illustrated in FIG. 13, a computer 300 includes a CPU (Central Processing Unit) 310, a ROM (Read Only Memory) 320, an HDD (Hard Disk Drive) 330, and a RAM (Random Access Memory) 340. These units 300 to 340 are connected via a bus 350.

A design support program 330a that exerts similar functions to those of the units 14a to 14h illustrated in the above embodiment is previously stored in the HDD 330. The design support program 330a may be separated as appropriate.

The CPU 310 reads the design support program 330a from the HDD 330 and executes the design support program 330a.

Design data and a check result file are provided in the HDD 330.

The CPU 310 reads the design data and the check result file and stores them in the RAM 340. Furthermore, the CPU 310 uses the design data and check result file that are stored in the RAM 340 to execute the design support program 330a. With regard to the data stored in the RAM 340, all the data are not necessarily always stored in the RAM 340, and it is sufficient if only data to be used for a process among all the data are stored in the RAM 340.

The above design support program 330a is not necessarily stored in the HDD 330 from the beginning.

For example, the program is stored in "portable physical media," such as a flexible disk (FD), a CD-ROM, a DVD disk, a magneto-optical disk, and an IC card, that are inserted into the computer 300. The computer 300 may read the program from them and execute the program.

Furthermore, the program is stored in "another computer (or server)" and the like, which are connected to the computer 300 via a public network, the Internet, a LAN, and a WAN. The computer 300 may read the program from them and execute the program.

According to one form of a design support apparatus, a design support method, and a design support program, it is possible to reduce the load of layout design.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A design support apparatus, comprising:
a memory; and
a processor coupled to the memory, wherein the processor executes a process comprising:
when a power line runs parallel between two signal lines in a circuit, partitioning a direction in which the two signal lines extend into a plurality of sections based on a position of the power line running parallel;
calculating a crosstalk noise value when the power line does not run parallel, for each of the plurality of sections;
calculating a coefficient that becomes larger with decrease in an area of the power line included in an area between the two signal lines based on a relative positional relationship between the two signal lines and the power line in the section, for each of the plurality of sections;
correcting the crosstalk noise value corresponding to each section, using the coefficient corresponding to each section, for each of the plurality of sections; and
calculating a total of the crosstalk noise values corrected and corresponding respectively to the plurality of sections, as a crosstalk noise value between the two signal lines.

2. The design support apparatus according to claim 1, wherein in a case where the two signal lines and the power line are projected onto a predetermined plane, when out of two projection areas of the two signal lines onto the predetermined plane, an entire area of one of shooting areas is included in a projection area of the power line onto the predetermined plane, the calculating the coefficient includes calculating the coefficient that becomes larger with decrease in a rate of the projection area, included in the other shooting area, of the power line onto the predetermined plane, for each of the plurality of sections.

3. The design support apparatus according to claim 2, wherein the calculating the coefficient includes calculating a maximum value of the coefficient as the coefficient for each of the plurality of sections, when the other shooting area does not include the projection area of the power line onto the predetermined plane.

4. The design support apparatus according to claim 3, wherein the calculating the coefficient includes calculating a minimum value of the coefficient as the coefficient for each of the plurality of sections, when the entire area of the other shooting area includes the projection area of the power line onto the predetermined plane.

5. A design support method, the design support method comprising:
when a power line runs parallel between two signal lines in a circuit, partitioning a direction in which the two signal lines extend into a plurality of sections based on a position of the power line running parallel;
calculating a crosstalk noise value when the power line does not run parallel, for each of the plurality of sections;
calculating, using a computer, a coefficient that becomes larger with decrease in an area of the power line included in an area between the two signal lines based on a relative positional relationship between the two signal lines and the power line in each section, for each of the plurality of sections;
correcting the crosstalk noise value corresponding to each section, using the coefficient corresponding to each section, for each of the plurality of sections; and
calculating a total of the corrected crosstalk noise values corresponding respectively to the plurality of sections as a crosstalk noise value between the two signal lines.

6. A non-transitory computer-readable recording medium having stored therein a design support program causing a computer to execute a process comprising:
when a power line runs parallel between two signal lines in a circuit, partitioning a direction in which the two signal lines extend into a plurality of sections based on a position of the power line running parallel;
calculating a crosstalk noise value when the power line does not run parallel, for each of the plurality of sections;
calculating a coefficient that becomes larger with decrease in an area of the power line included in an area between the two signal lines based on a relative positional relationship between the two signal lines and the power line in each section, for each of the plurality of sections;
correcting the crosstalk noise value corresponding to each section, using the coefficient corresponding to each section, for each of the plurality of sections; and
calculating a total of the corrected crosstalk noise values corresponding respectively to the plurality of sections as a crosstalk noise value between the two signal lines.

* * * * *